United States Patent [19]

Andersson et al.

[11] Patent Number: 5,197,695
[45] Date of Patent: Mar. 30, 1993

[54] LOCKING DEVICE FOR A BAND OR THE LIKE, SUBJECT TO A TENSILE FORCE

[75] Inventors: Torbjorn Andersson, Vikingstad; Ingvar Bengtsson, Linkoping; Orjan Arulf, Linuoping; Johan Ohlin, Rimforsa, all of Sweden

[73] Assignee: SAAB Space Aktiebolag, Sweden

[21] Appl. No.: 845,421

[22] Filed: Mar. 4, 1992

[30] Foreign Application Priority Data

Mar. 4, 1991 [SE] Sweden .............................. 9100609

[51] Int. Cl.$^5$ .............................................. B64G 1/64
[52] U.S. Cl. .............................. 244/129.1; 244/158 R; 244/120; 102/377; 292/113; 292/DIG. 49; 24/68 BT; 24/273
[58] Field of Search ............... 244/129.1, 172, 54; 102/377; 292/113, DIG. 49, 66; 24/270, 277, 68 BT, 68 CD, 68 CT; 220/321, 320; 410/100; 254/120

[56] References Cited

U.S. PATENT DOCUMENTS

| 759,305 | 5/1904 | Nunn ........................... 24/273 |
| 815,558 | 3/1906 | Rosier ......................... 24/68 BT |
| 892,197 | 6/1908 | Umpleby et al. ............ 24/273 |
| 1,230,146 | 1/1917 | Frieze . | |
| 3,844,594 | 10/1974 | Romberg ..................... 292/66 |
| 4,715,565 | 12/1987 | Wittmann .................... 220/321 |

FOREIGN PATENT DOCUMENTS 552347  1/1958  Canada ................................. 24/273

Primary Examiner—Galen Barefoot
Attorney, Agent, or Firm—Lowe, Price, LeBlanc & Becker

[57] ABSTRACT

A locking device for a band or the like comprising a housing having one end fastened to a first portion of the band. The housing extends in the direction of the prevailing tensile force and is formed with a guide for guiding a link means. This comprises a fastening element fastened at its first end to the second portion of the band and at its second end journally connected to a second link at a distance from its first end. The second link is, at its first end, journaled around an axis provided in the housing transverse to the longitudinal direction of the housing. The locking device also comprises a third link journaled at the first end of the housing and a dowel element which, 1 via the third link, is able to prevent the second link from being turned around the axis to a position where it is released from the axis so that the locking device is opened.

4 Claims, 1 Drawing Sheet

LOCKING DEVICE FOR A BAND OR THE LIKE, SUBJECT TO A TENSILE FORCE

This invention relates to a locking device for a band, strap or the like which is subject to a tensile force. Such locking devices are used, among other things, for fastening a satellite to an adapter on a launch vehicle for launching a satellite into space. On this occasion, the satellite is fastened to the adapter by a band or strap, which is stretched around a first flange means at the satellite and a second flange means at the adapter. The band includes means for releasing the satellite from the adapter when the launch vehicle or carrier rocket has reached a predetermined altitude and track. Previously this means has comprised one or more pyrophoric bolts, that is to say, bolts which keep the band under a predetermined tension and which are provided with shearing means that shear the bolt under the influence of an exploding charge which is triggered by electric means so that the tension of the band is released.

Such pyrophoric bolts have certain deficiencies. They unavoidably cause flakings and other impurities to be released in large numbers at the explosion. The explosion also gives rise to a movement impulse that may be difficult to compensate. An explosive charge also involves a risk in that the pyrophoric bolt cannot be pre-tested because it is not reusable.

The object of the present invention is thus to provide a locking device of the type mentioned which in no way emits impurities when used, nor does it create a large movement impulse when releasing the band tension. The device may be tested and is reusable.

According to the invention, such a locking device is characterized by the combination of a housing, which is fastened at its first end to a first portion of the band. The housing is formed so as to have its longitudinal direction extend in the direction of the prevailing tensile force. The housing is associated with a guide means and with a link means which is formed to be guided by the guide. The link means comprises a fastening element which is fastenable at its first end to a second portion of the band, and is journally engaged at its second end to the first end of a link which link at its second end is journally engaged to a second link at a distance from its first end. The second link at its first end is journaled around an axis provided in the housing transverse to the longitudinal direction of the housing. A third link is journaled at the first end of the housing. There is also provided a first dowel element which in a first position locks the second link via the third link from being turned around the axis into a second position. In this position the third link releases the second link to turn around its axis to a position where the second link is released from its axis so that the fastening element under influence of the tensile force is given a movement away from the housing.

In one preferred embodiment of the invention the first dowel element is arranged to move between its first and second positions under the influence of an electromagnet.

In one embodiment of the invention a second dowel element is arranged to exercise a force tending to turn the second link around its axis away from the housing.

In another embodiment said axis is so arranged and disposed that the axis of rotation is at a distance from the longitudinal axis of symmetry of the second link so that the second link in traction with the first link in the direction of said tensile force is given a turning movement around the axis, to move the fastening element away from the housing.

The invention is now described more in detail with reference being made to the accompanying figures of drawing.

Figure 1:
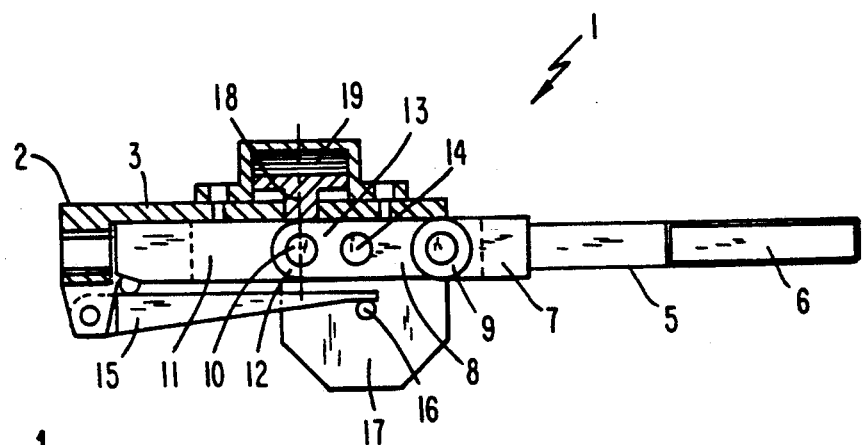
FIG. 1 shows a side view, partly in section, of a locking device according to the invention in locked position.
Figure 2:
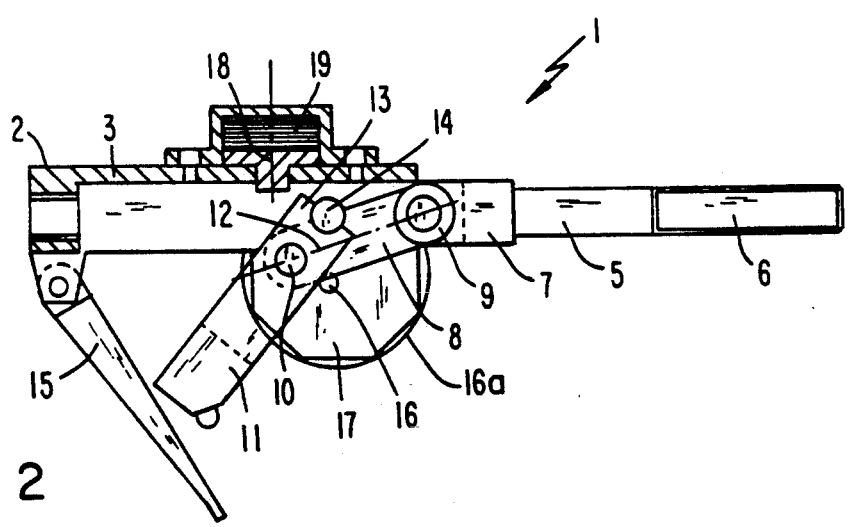
FIG. 2 is a similar view showing the same device unlocked.

Referring to FIGS. 1 and 2 there is shown a housing generally indicated at 1 having an end 2. The first end of a band, not shown, is fastenable at this end. The housing is formed so as to be elongated in the direction of the application of the tensile force and forms a guide 3 by which a link means 4 is guided. This link means comprises a fastening element 5 which is fastenable at its first end 6 to the second end of the band (not shown). At its second end 7 the link 5 is pivotally connected to a first link 8 at its first end 9. The link 8 is pivotally connected at the second end 10 to a second link 11 at a distance from the first end 12 of the second link 11. The first end 13 of the second link 11 is pivotally journaled around an axis 14 provided in the housing transversely to the longitudinal direction of the housing 1. A third link 15 is pivotally connected at its end to the first end 2 of the housing 1.

A first dowel element 16 is arranged in a first position to lock the second link 11 via the third link 15 from being turned around the axis 14. In a second position it is arranged to release the second link 11 to pivot around said axis to a position where the second link is released so that the fastening element 5 may be drawn away from the housing 1 by the tensile force so that the tension in the band is released The first dowel element 16 is acted upon by an electromagnet 16a attached to fastening plate 17 to urge the dowel element 16 to move out of the path of link 15 when the electromagnet is energized.

In the starting position with the locking device locked and tensile force acting upon the first end of the housing 1 and on the fastening element 5, there is no transverse force component acting to tend to release the link means 4 even if the third link 15 is release from the first dowel element 16. In one embodiment a second dowel element 18 is provided to exert such a force rotating the second link 11 around the axis away from the housing 1. The dowel element 18 is in this embodiment urged by a mechanical spring 19 which is tensioned when the locking device is in the locked position.

Figure 3:
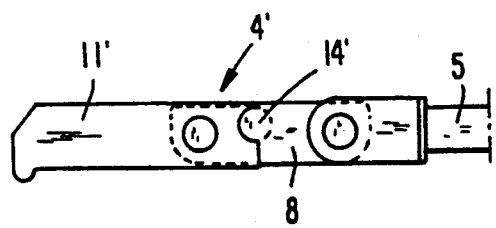
FIG. 3 is a side view of an alternative embodiment of a link mechanism in a locking device according to the invention.
Figure 4:
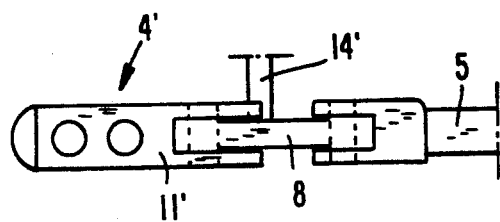
FIG. 4 shows a top plan view of the device of FIG. 3.

In an alternative embodiment of the invention, the axis 14' is arranged in the housing 1 with its axis of rotation at a distance from the longitudinal axis of symmetry of the second link 11, so that the second link 11' is under traction from the first link 8 in the direction of said tensile force due to lever arm action. This action gives the link a turning movement around the axis 14' so that the fastening element 5 can be drawn away from the housing 1. This embodiment is shown with the link means 4' belonging thereto in FIGS. 3 and 4.

It will be readily seen by one of ordinary skill in the art that the present invention fulfills all of the objects set forth above. After reading the foregoing specification, one of ordinary skill will be able to effect various changes, substitutions of equivalents and various other aspects of the invention a broadly disclosed herein. It is therefore intended that the protection granted hereon be limited only by the definition contained in the appended claims and equivalents thereof.

We claim:

1. A locking device for band means for fastening satellite means to adapter means on a launch vehicle characterized in the combination of:

a housing fastened at a first end to a first portion of said band, said housing being formed with an elongated dimension and axis extending in the direction of a tensile force in said band, said housing including guide means and link means disposed to be guided by said guide means, which link means comprises a fastening element arranged to be attached at its first end to a second part of said band, said fastening element being pivotally connected at its second end to said first link at its first end, which link at its second end is pivotally connected to a second link at a distance from its first end, said second link being journaled at its first end around an axis transverse to the longitudinal direction of the housing;

third link means journaled at the first end of the housing;

a first dowel element in a first position locking the second link via the third link means from turning around said axis and in a second position releasing the second link to be turned around said axis to a position where the second link is disposed to be released from said transverse axis 14 so that the fastening element under influence of the tensile force moves away from said housing.

2. A locking device according to claim 1 characterized in that the first dowel element is arranged to be moved between locking and unlocking positions under the influence of an electromagnet.

3. A locking device according to claim 1 characterized in that there is provided a second dowel element arranged to exert a force tending to turn the second link around said axis away from the housing.

4. A locking device according to claim 1 characterized in that said axis is arranged with its axis of rotation at a distance from the longitudinal axis of symmetry of the second link so that the second link under tensile force from the first link is given a turning movement around the axis to move the fastening element away from the housing.

* * * * *